United States Patent Office 3,455,004
Patented July 15, 1969

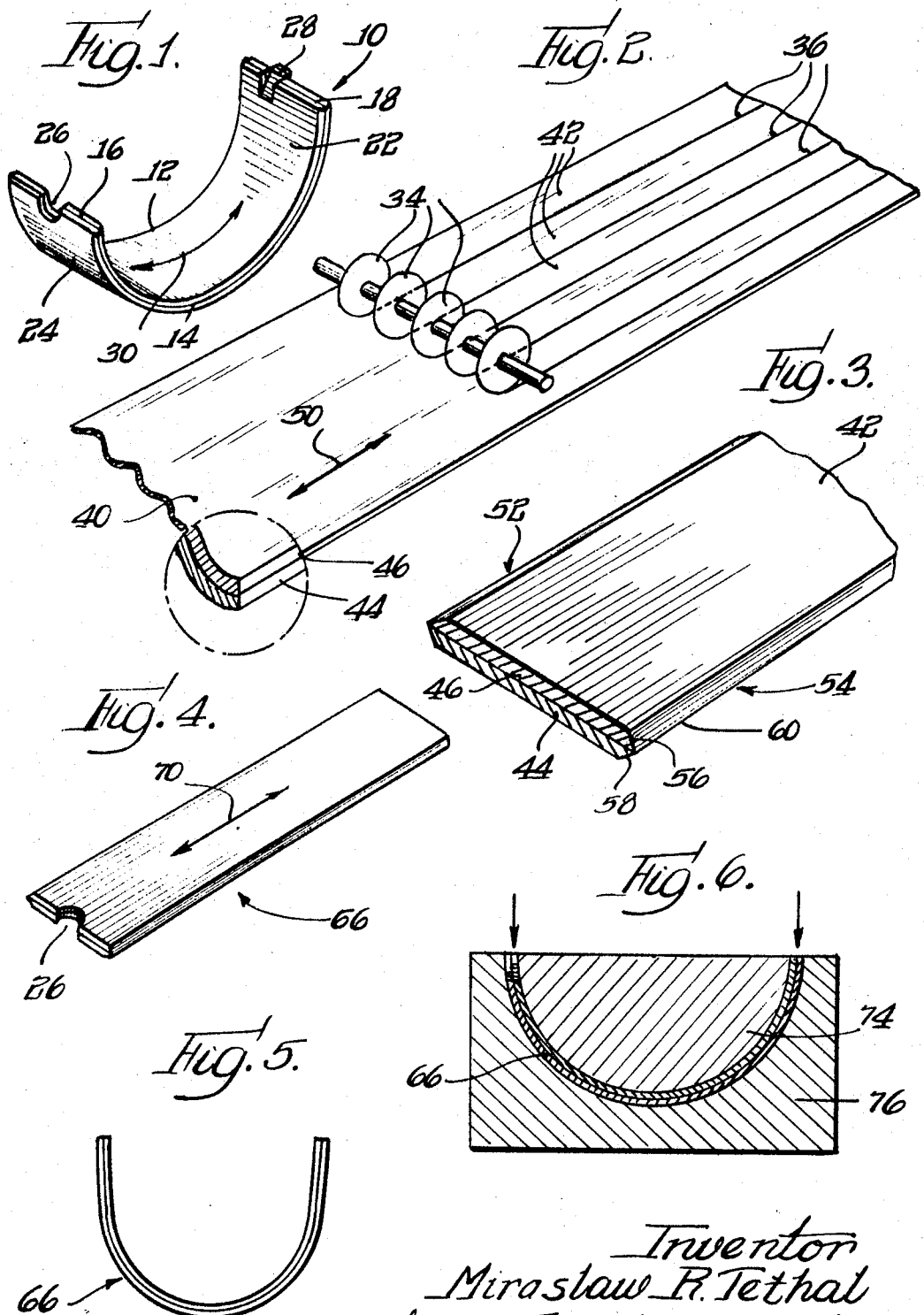

3,455,004
METHOD OF MAKING A BEARING STRUCTURE
Miroslaw R. Tethal, 231 N. 2nd St., Elsie, Mich. 48831
Filed Jan. 6, 1967, Ser. No. 607,716
Int. Cl. B21d *53/10;* F16c *33/00*
U.S. Cl. 29—149.5                        2 Claims

ABSTRACT OF THE DISCLOSURE

In accordance with the method of fabricating a bearing, as herein set forth, a laminated sheet comprised of the bearing material and backing is slit, preferably by rotary saws to form a plurality of strips with the metal grain structure running longitudinally of the strips. The strips are then chamfered along their sides to provide smooth edges, and they are thereafter severed into suitable lengths, and then bent longitudinally to provide individual curved bearing members.

---

This invention relates to a method of forming a bearing structure. More specifically, this invention relates to a method of making a plain or sleeve-type bearing including a base or shell having a lengthwise grain.

Bearing structures have previously been made by scoring opposite sides of a laminated sheet to delineate bearing sections. The generally V-shaped score marks are positioned in vertical alignment on the base or shell layer and a layer of bearing material of the laminated sheet. The score marks extend generally transversely or crosswise of the sheet. The sheet is next trimmed to a predetermined width or transverse dimension in accordance with the length of the bearing to be fabricated. The bearing sections are then broken off the sheet by severing the sheet at the vertically aligned V-shaped score marks. It should be noted that a requisite bevel is provided on opposite longitudinal side edges of the bearing sections by the opposing V-shaped score marks. Next the bearing sections are formed into a U-shape and are finally coined into a hemispherical shape.

The aforementioned method of forming sleeve-type bearings has not proven to be altogether satisfactory. Difficulties are encountered in aligning the V-shaped score marks on opposite sides of the sheet. Even when the score marks are aligned it is difficult to break or sever the sheet at exactly the opposing score marks. These production difficulties result in a relatively large amount of scrap. Of course, the relatively high scrap rate increases the cost of fabricating the bearing.

In addition to the production difficulties with prior art manufacturing methods, the prior art bearing structures have proven to be unsatisfactory in several respects. The bevels or chamfers on the longitudinal edges of the bearing are usually rough or irregular. This roughness results from severing each bearing section from the adjacent bearing sections by breaking the sheet at the opposing V-shaped score marks. The broken section of material between an apex of the V-shaped score marks is rough and irregular.

Prior art bearing structures have also been found to be deficient in uniformity and strength. The lack of strength and uniformity results from the orientation of the grain structure of the metal used in the base or shell of prior art bearings. The direction of the grain of the metal in the shell is determined when the metal is formed or rolled and results from longitudinally extending relatively hard and soft areas in the rolled metal. When the bearing blank or section extends transversely of the grain of the metal, as in prior art bearings, alternate soft and hard areas extend transversely to the bearing blank or section. These alternate hard and soft transversely extending areas result in an uneven coining during the fabrication of the bearing and weaken the fabricated bearing.

Therefore, a general object of this invention is to provide an improved method of forming the bearing which overcomes the aforementioned limitations of the prior art constructions. Specifically, it is an object of this invention to provide a method resulting in bearing structure which is relatively strong and has smooth beveled edges.

Another object of this invention is to provide a method of fabricating a bearing which eliminates the necessity of aligning score marks on opposite sides of a sheet of material.

Another object of this invention is to provide an inexpensive method of fabricating a metal bearing with the grain of the base or shell extending longitudinally of the bearing.

These and other objects and features of the invention will become more apparent upon a reading of the following detailed description taken in connection with the accompanying drawings wherein:

FIG. 1 is a perspective view of a bearing formed in accordance with a preferred embodiment of the invention;

FIG. 2 is a schematic illustration, on a reduced scale, illustrating the slitting of a sheet of material to form strips which extend substantially parallel to the grain of the metal;

FIG. 3 is an enlarged perspective view of a strip of metal formed as illustrated in FIG. 2 with a plurality of chamfers along the edges of the strip;

FIG. 4 is a perspective view of a bearing blank or section formed from the strips of material illustrated in FIGS. 2 and 3;

FIG. 5 is an elevational view of the bearing section of FIG. 4 after the section has been forged to a generally U-shape; and FIG. 6 is a schematic illustration showing the coining or forging of the generally U-shaped bearing section of FIG. 5 to a semicircular configuration.

Referring now to the drawings in greater detail, a plain or sleeve-type laminated bearing 10 formed in accordance with a preferred embodiment of the invention is illustrated in FIG. 1. The bearing 10 includes a pair of spaced apart parallel arcuate beveled side walls 12 and 14 which are interconnected by a pair of transversely extending end walls 16 and 18. These walls define the extremities of a radially inner bearing surface 22 and a radially outer shell or base surface 24. An oil notch 26 is formed at one end of the semi-circular bearing. A positioning lip or key 28 is formed at the opposite end of the bearing.

The general structure and purposes for which the sleeve-type bearing 10 can be used are well known to those skilled in the art and need not be described in greater detail at this time. However, it should be noted that a sleeve-type bearing 10 is different from the conventional or prior art bearing structures in that the sleeve type bearing 10 has a shell or base, indicated at 24, with a grain structure which extends longitudinally of the bearing in a substantially parallel relationship with the beveled side surfaces 12 and 14, as indicated by the arrow 30. Thus, the grain of the shell or base of the bearing 10 extends from the transverse ends 16 and 18 in a parallel relationship with the longitudinal sides 12 and 14 of the bearing 10.

A plurality of circular cutting knives or saws 34 are illustrated in FIG. 2 for cutting a plurality of slits 36 in a sheet 40. The slits 36 sever the sheet to form longitudinally extending strips or sections 42. The sheet 40, as shown in the enlarged section at the lower left of FIG. 2, has a laminated structure including a steel base or shell 44 upon which a layer of bearing material 46 is deposited. The bearing material 46 can be formed of any of the known bearing metals such as Babbitt metal, white metal, brass, or Phosphor bronze. The grain of the rolled steel base 44 extends longitudinally of the sheet 40 in the direction indicated by the arrow 50 in FIG. 2.

The strips 42 are chamfered or beveled along their opposite edge portions as indicated at 52 and 54 of FIG. 3. The bevels or chamfers include a first surface 56 at the edge of the bearing material 46 and a second surface 58 at the edge of the base or shell 44. The two surfaces 56 and 58 intersect at an apex 60 at the junction between the bearing material 46 and shell 44. It should be noted that the surfaces 52 and 54 are smooth and continuous.

After the strips 42 have been chamfered, as illustrated in FIG. 3, the strips are cut or blanked into a plurality of bearing blanks or sections 66 (see FIG. 4) with the grain of the base or shell 44 extending longitudinally of the bearing section 66 as illustrated by the arrow 70. During the blanking or cutting operation of the bearing section 66 the oil notch 26 is advantageously formed at one end of the bearing section. Of course, the length of the bearing section 66 is a function of the radius of the semi-circular sleeve-type bearing which is to be formed from the section.

After the bearing sections 66 have been cut from the strips 42, they are forged or otherwise formed into a generally U-shape, as shown in FIG. 5. The generally U-shaped bearing section or blank of FIG. 5 is coined to a semi-circular shape in a plurality of dies 74 and 76, as illustrated in FIG. 6. The generally U-shaped blank 66 is coined or forged by the dies 74 and 76 in a well known manner to form the semi-circular bearing of FIG. 1. After the bearing blank 66 has been given a semi-circular shape by the coining process, the positioning notch 28 is formed in the transversely extending edge portion of the bearing.

In view of the foregoing remarks, it will be apparent that the present invention relates to the method of forming a bearing structure 10 wherein the grain of the metal used in the base or shell 44 extends or flows in a longitudinal direction relative to the bearing. The longitudinally extending grain structure increases the strength of the base shell and facilitates coining of the base shell. In addition, the present invention relates to a method of forming the bearing structure 10 wherein a plurality of longitudinally extending strips 42 are cut from a laminated sheet 40. The strips 42 are then beveled or chamfered to provide a smooth longitudinally extending bevel at the side walls 12 and 14 of the bearing 10. The beveled or chamfered strip 42 is then cut or severed to form bearing sections or blanks 66. The bearing blanks 66 are initially formed to a generally U-shape, as shown in FIG. 5. The bearing blank 66 is then coined or forged to a semicircular shape, as shown in FIG. 6. This method of fabricating the bearing 10 reduces scrap, since there is no necessity of aligning score marks on opposite sides of the laminated sheet 40 as is done in prior art bearing fabricating methods.

While a particular embodiment of the invention has been shown, it should be understood, of course, that the invention is not limited thereto since many modifications may be made; and it is, therefore, contemplated to cover by the appended claims any such modifications as fall within the true spirit and scope of the invention.

What is claimed is:

1. A method of forming a sleeve-type bearing, said method comprising the steps of: slitting a sheet of metal having a grain into strips with the slits extending substantially parallel to the general direction of the grain of the metal; and forming the strips of metal into sleeve-type bearings with the grain of the metal extending substantially longitudinally of the bearing.

2. A method as set forth in claim 1 wherein said forming steps include: chamfering longitudinal edges of the strips of metal; bending the strips into a generally U-shape; and coining the generally U-shaped strips into semi-circular sleeve-type bearings.

References Cited

UNITED STATES PATENTS

| 1,691,073 | 11/1928 | Klocke | 29—149.5 |
| 1,787,255 | 12/1930 | Klocke | 29—149.5 |
| 1,924,230 | 8/1933 | Davis | 29—149.5 |
| 2,255,572 | 9/1941 | Schwartz | 29—149.5 |

THOMAS H. EAGER, Primary Examiner

U.S. Cl. X.R.

29—415, 417; 308—237